May 25, 1965 R. P. THORN 3,185,415
BASE FOR RESILIENT LOAD SUSPENSION
Filed Jan. 30, 1962 2 Sheets-Sheet 1

INVENTOR.
Richard P. Thorn
BY Ralph Hammar
Attorney

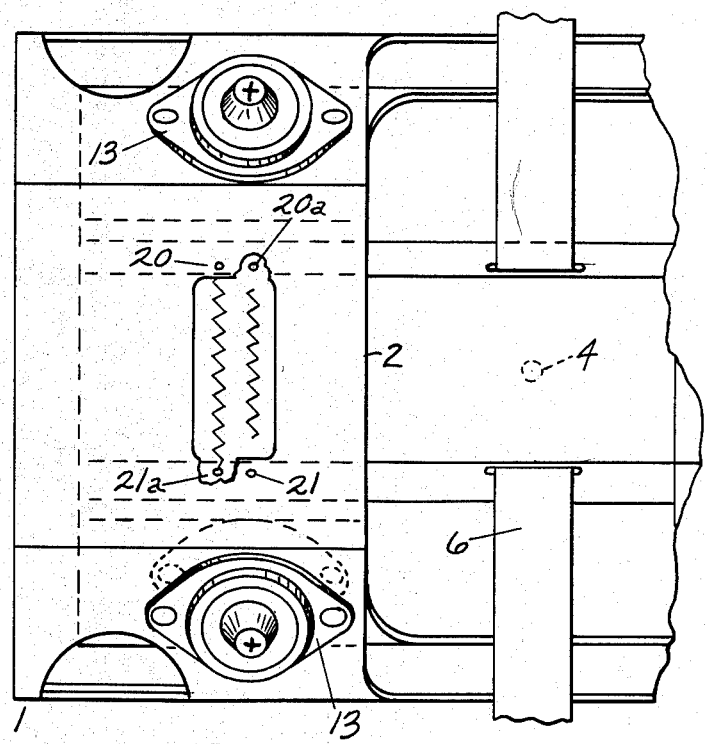
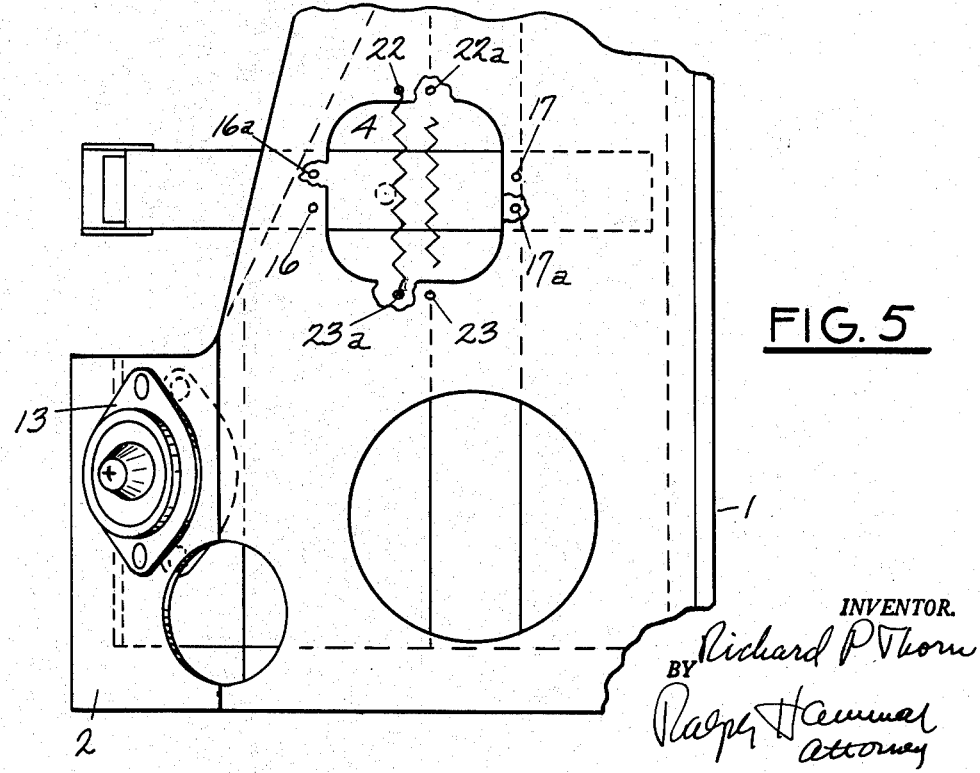

United States Patent Office 3,185,415
Patented May 25, 1965

3,185,415
BASE FOR RESILIENT LOAD SUSPENSION
Richard P. Thorn, Erie, Pa., assignor to Lord Manufacturing Company, Erie, Pa., a corporation of Pennsylvania
Filed Jan. 30, 1962, Ser. No. 169,899
2 Claims. (Cl. 248—21)

This invention is a universal base for mounting in positions on any one of three mutually perpendicular axes with provisions for compensating for the gravity load of equipment carried by the base.

Figure 3:
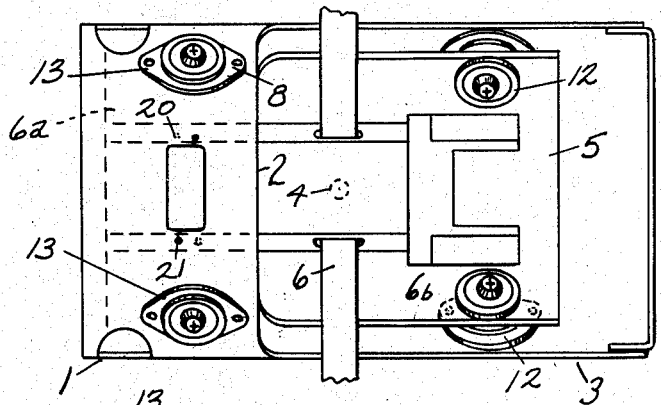
Figure 1:
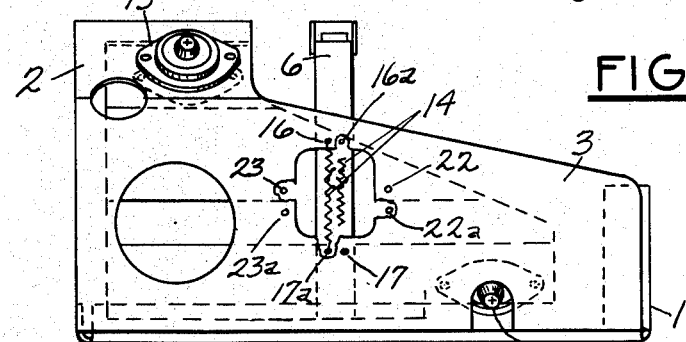
Figure 2:
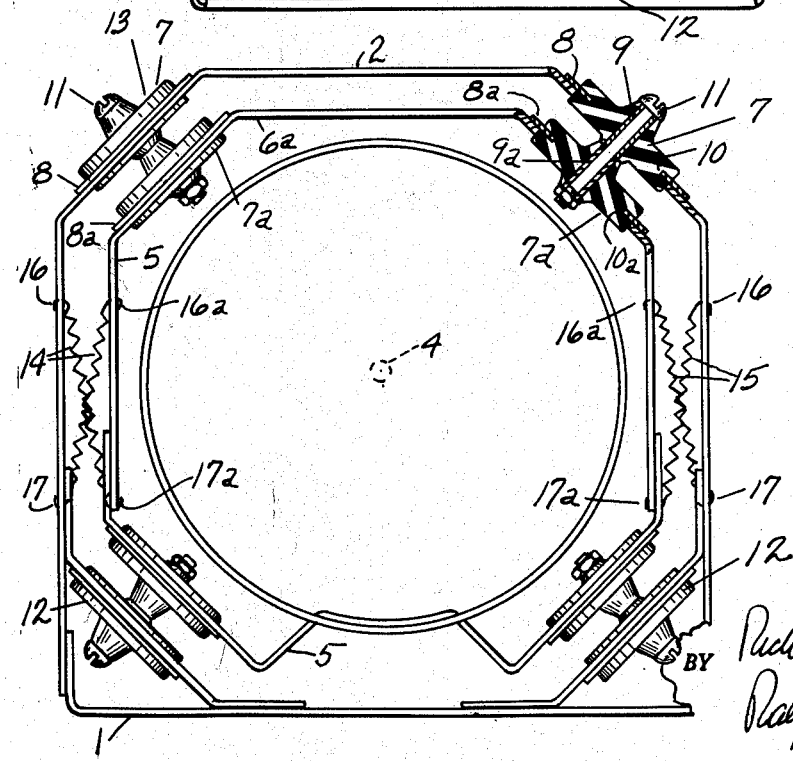

In the drawings, FIGS. 1, 2, and 3 are side, end and top views of the base in one mounting position and FIGS. 4 and 5 are views of the base in its other mounting positions.

The base has a sub-frame 1 to be mounted on a supporting structure. The sub-frame has upstanding portions 2 and 3 for carrying the supported equipment, the portions 2 and 3 being arranged on opposite sides and above and below the center of gravity 4 of the equipment. The portion 2 of the sub-frame is in the form of a shell enclosing the sides and top while the top portion 3 of the sub-frame is open at the top. Spaced inward from the sub-frame 1 is a frame 5 having at its center a clamping ring 6 for fastening the equipment to the frame. The frame has at one end a shell 6a spaced inward from the shell 2 of the sub-frame and at the opposite end a section 6b spaced from the part 3 of the sub-frame.

Between sub-frame and frame are resilient mountings symmetrically disposed with respect to the center of gravity of the supported equipment. These mountings are arranged to have substantially equal spring rates in all directions. The particular mountings illustrated are those described in greater detail in Patent 2,019,052 and comprise bodies 7, 7a of rubber bonded to plates 8, 8a, respectively attached to the sub-frame and the frame. At the center of each of the bodies of rubber is a sleeve 9, 9a extending through the center of an associated opening 10, 10a in the plate. The sleeves 9, 9a are connected together by a through bolt 11. This mounting arrangement, in common with other available mountings, provides substantially equal spring rates in all directions. From any point of view, the mountings connecting the frame 5 and sub-frame 1 are symmetrically disposed with relation to the center of gravity 4 of the equipment to be supported. In the side view of FIG. 1 it appears that the mountings are disposed at opposite ends of the frame with mountings 12 at the front and mountings 13 at the back. In the end view of FIG. 2, the mountings 12 are arranged in lower quadrants while the mountings 13 are arranged in upper quadrants. In the plan view of FIG. 3 the mountings 12 and 13 are symmetrically disposed with respect to both longitudinal and cross axes of the base. The described distribution of the mountings provides what is known in the art as a "center of gravity suspension" in that the supported equipment is supported as though all of the mountings were located at the center of gravity. In the particular mounting arrangement, the mountings 12 and 13 are arranged in a plane passing diagonally through the center of gravity 4. The same center of gravity suspension could be obtained with the mountings arranged in any other plane passing through the center of gravity. The particular mounting arrangement allows the ends 3, 6b of the base and frame to be open for ease of loading the equipment into the supporting ring 6.

The direction of the gravity load of the supported equipment depends upon the position in which the base is mounted. In the position shown in FIG. 1, the gravity load acts downward perpendicular to the base. In the position shown in FIG. 4, the gravity load acts parallel to the base and in a crosswise direction. In the position shown in FIG. 5, the gravity load acts parallel to the base and endwise.

In order to provide equal performance of the base in all mounted positions, two pairs of coil springs 14 and 15 are provided which can be hooked into registering holes in the sub-frame 1 and frame 5. For the horizontal position shown in FIG. 1, the upper ends of the springs are hooked into holes 16 on the center section of the sub-frame 1 and the lower ends of the springs are hooked into holes 17a on the frame 5. If the base were inverted from the FIG. 1 position, the upper ends of the springs would be hooked into holes 17 on the base 1 and the lower ends of the springs would be hooked into holes 16a on the frame 5. The holes 16 register with the holes 16a and the holes 17 register with the holes 17a so that the same load carrying effect is obtained in either arrangement of the springs. In FIG. 2, one of the springs 14, 15 is shown arranged to support the equipment with the base in the FIG. 1 position while the other of the springs is shown in position to support the equipment in the inverted FIG. 1 position. For the mounting position of FIG. 4, there are holes 20, 21 registering with holes 20a, 21a in the frame 5. For the FIG. 5 position there are holes 22, 23 in the sub-frame 1 registering with holes 22a, 23a in the frame 5. All of the holes 16, 17, 20, 21, 22, 23 and 16a, 17a, 20a, 21a, 22a, 23a are in sets symmetrically disposed with respect to the center of gravity of the equipment. By selecting the appropriate pairs of holes, the springs 14, 15 can be arranged to sustain the gravity load of the mounted equipment in any of the mounting positions. The coil springs have a stiffness substantially less than the stiffness of the mountings 12, 13 so that the springs do not interfere with the vibration isolation characteristics of the mountings. The pivotal connection between the ends of the springs and the associated pairs of holes confines the action of the springs essentially to supporting the gravity load and avoids a cross coupling which could modify the vibration isolation characteristics.

What is claimed as new is:

1. A universal base for mounting on any one of three mutually perpendicular axes passing through a point comprising, a sub-frame for attachment to a supporting structure, an equipment carrying frame, resilient means for supporting the equipment carrying frame on the sub-frame with substantially equal resilience in all directions, the sub-frame and the equipment carrying frame having two pairs of holes disposed respectively on one and on the other side of each of said axes, the holes of each pair being spaced axially with respect to its axis with one hole of each pair in the equipment frame and the other hole of each pair in the sub-frame, and coil springs having stiffness substantially less than the stiffness of the resilient means and having ends adapted to be hooked into selected pairs of holes in load carrying relation between the equipment frame and the sub-frame for sustaining the gravity load of the equipment frame and equipment carried thereby as the frames are oriented along a chosen axis.

2. A universal base for mounting on any one of three mutually perpendicular axes passing through a point comprising, an outer frame for attachment to a supporting structure, an inner frame spaced from the outer frame and having resilient means for supporting the inner frame on the outer frame with substantially equal resilience in all directions, the outer frame and the inner carrying frame having two pairs of holes disposed respectively on one and on the other side of each of said axes, the holes of each pair being spaced axially with respect to its axis with one hole of each pair in the inner frame and the other hole of each pair in the outer frame, and coil springs having stiffness substantially less than the stiffness of the resilient means and having ends adapted to be hooked into selected pairs of holes in load carrying relation between the inner and outer equipment frames for sustaining the gravity load of the inner equipment frame and the equipment carried thereby as the frames are oriented along a chosen axis.

References Cited by the Examiner

UNITED STATES PATENTS

| | | | |
|---|---|---|---|
| 956,810 | 5/10 | Lamasney | 248—358.1 |
| 2,481,505 | 9/49 | Frazier | 248—358 |
| 2,684,825 | 7/54 | Laviana | 248—358 |
| 2,685,425 | 8/54 | Wallerstein | 248—358 |
| 2,847,178 | 8/58 | Essex | 248—358 |

FOREIGN PATENTS 340,550   5/36   Italy.

CLAUDE A. LE ROY, *Primary Examiner.*